Jan. 14, 1947.  F. E. THOMAS  2,414,179
WOODPECKER TOY
Filed Feb. 1, 1944
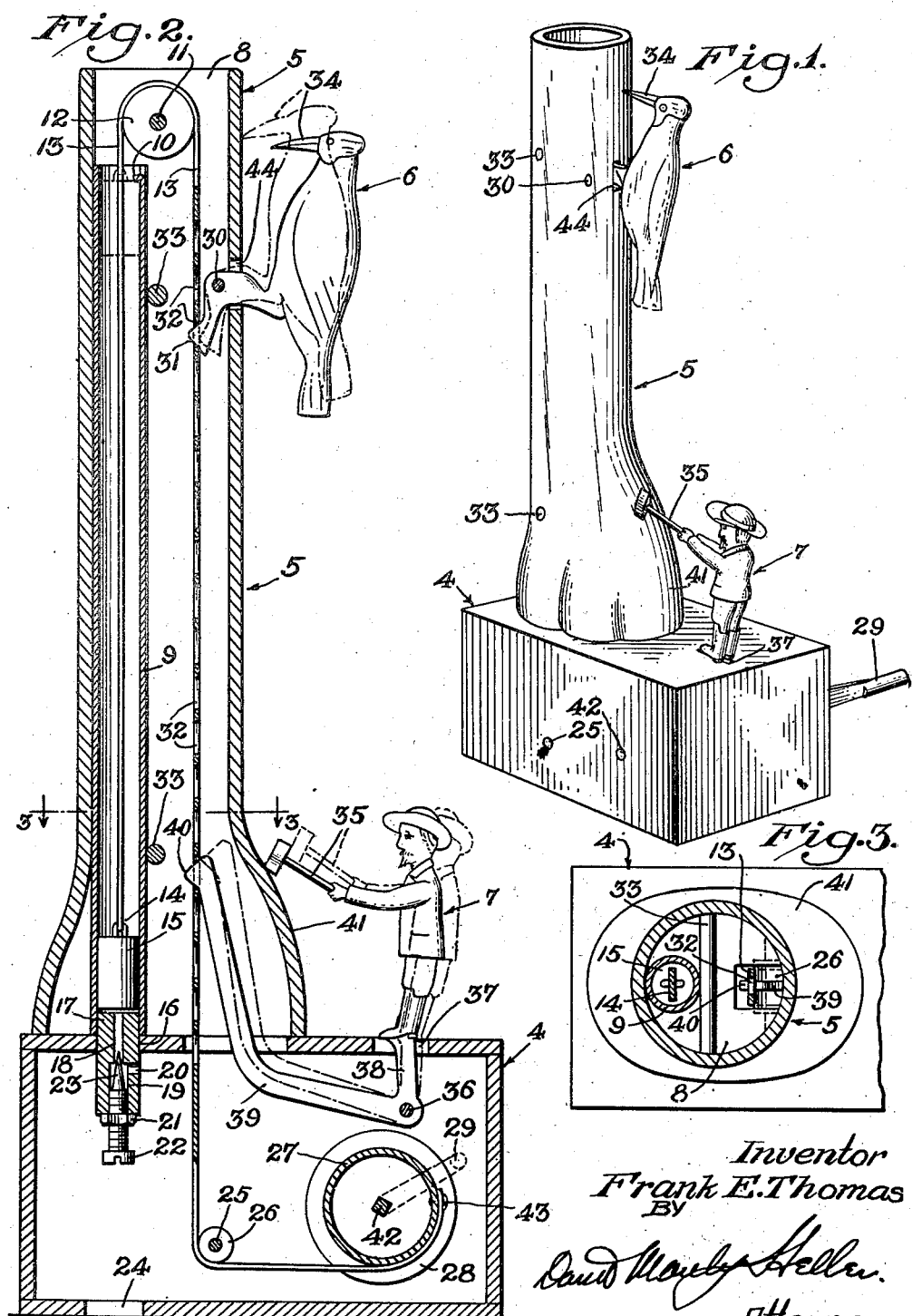
Inventor
Frank E. Thomas
By
David Marly Heller
Attorney.

Patented Jan. 14, 1947

2,414,179

UNITED STATES PATENT OFFICE 2,414,179

WOODPECKER TOY

Frank E. Thomas, Chicago, Ill.

Application February 1, 1944, Serial No. 520,607

5 Claims. (Cl. 46—118)

This invention appertains to an animated toy, and is especially directed to a structure comprising a gravity operated actuating tape mechanism which actuates a figure simultaneously producing animation in the said figures, as well as producing a resultant tonal effect.

One object of my invention is to provide a gravity operated actuating mechanism, which operates in a fluid filled cylinder provided with adjustable exhaust means so as to enable one to vary the rate of drop, or the gravitational velocity of the weight mechanism.

Another object of my invention is to provide a winding means for winding the said belt or tape actuating mechanism simultaneously with the said winding action producing animation and tonal effects in one or more figures mounted on the toy.

Another object of my invention is to provide extension means on the said figure which are adapted to be tripped by openings in the said tape, belting, or conveyer actuating mechanism.

Other objects, features and advantages resident in my invention will become apparent from reference to the accompanying drawing in connection with the ensuing description, in which like numerals are used to designate like parts, and in which:

Fig. 1 represents a perspective view of my invention.

Fig. 2 is an enlarged longitudinal cross-section taken on a median line of Figure 1.

Fig. 3 is a transverse cross-sectional view looking in the direction 3—3 of Figure 2.

Referring, more particularly, to Figure 1, 5 designates the bole of a tree which is, preferably, hollow in order to permit the mounting of suitable actuating mechanism therein, 6 represents the figure of a woodpecker, whereas 7, generally, designates the figure of a woodchopper, while 4, generally, designates a case on which the tree bole 5 is mounted and in which suitable auxiliary mechanism is mounted in order to translate the motion of the handle element 29 to produce actuation, as will be elucidated hereinafter in the description.

Referring, to Figures 2 and 3, it will be noted that the bole of the tree 5 is hollow, and is provided with an opening 8, and an enlarged section near its base designated 41 in order that it may look like a natural tree and also to furnish space in which to assemble the added mechanism necessary. The tree bole is, preferably, made up of a highly resonant material so as to produce sound when the beak of the woodpecker and the ax of the woodchopper are brought to bear on the same or are brought in contact with the same, intermittently, as will be seen from the explanation following in the description.

Within this bole 5 is mounted a tube 9 which has a small tooth portion 10 bent over from its upper portion in order to act as a stop for the counterweight 15 when it is raised, in order to allow its dropping to animate the figures 6 and 7. At the upper portion a pivot 11 is mounted in which an idler pulley 12 is secured to operate rotatably, and to support thereon the tape or belting 13 which has its lower end 14 secured to ears on the counterweight 15. The belting 13 for a considerable length thereof, is provided with openings 32 of sufficient dimension in order to react with the toothed extensions 31 and 40, respectively, and cause the same to be tripped thus actuating on their respective pivots, the figures 6 and 7 providing animation and sound effects as indicated by the dotted lines.

The tubing 9 is preferably held in place by pins 33 which are driven into the bole of the tree in order to confine the tubing 9 and prevent motion thereof. The belting 13 is wound about an idler roll 26 mounted on pivot 25 and in turn secured or fastened by rivet means 43 to the drum 27 of the spool-like structure 28. The spool 28 is secured to the axle 42 and rotates therewith. At the lower end of the tubing and within the hole 16 on the top of the casing 4 is mounted a bushing 17, provided with a small orifice 18, which connects with an enlarged threaded opening 19, and has a perpendicularly communicating lateral orifice 20. The threaded portion 19 is adapted to receive a screw 22 having a conically pointed portion 23 to permit adjustment to various positions, being held in adjustment by virtue of the lock nut 21.

The opening 24 in the case 4, provides accessibility to the adjustment of the lock nut 21 and the screw 22. The conical portion 23 is adapted to be adjusted so as to restrict or enlarge the communicating orifices 18 and 20, respectively, so as to permit the air in the tube 9 to be expelled by the descending weight 15 either more rapidly or more slowly. The said valve mechanism providing a controlling action to the gravitational effect of the weight 15 in its descent.

The figure 7 of the woodchopper is mounted on a bell crank lever having an extension 38, and a bent extension 39 being articulately pivoted at 36, the tooth 40 being adapted to oscillate when tripped by the holes 32 in the conveyer 13, and thus pendulate within the confinement of the solid and dotted lines indicated, thus actuating the ax 35 to the full and dotted lines, whence it will produce a resounding and harmonious effect when contacting the portion 41 of the bole 5. In like manner, the tooth 31 which is integrally mounted on the figure 6 and which in turn is pivoted at the point 30 will cause the beak 34 of the figure 6 to contact the resonant bole of the tree 5, and thus cause an additional sounding effect. The arrangement may be so positioned that the action of the beak 34 and the ax 35 will be intermittent or will occur simultaneously.

It will be noted, that I provide a clearance 37 in the top of the case 4 and a clearance opening 44 in the bole 5 in order to provide ample clearance for the movement of the figures 6 and 7 when animation occurs.

The operation of the toy is rather simple. The handle of the toy 29 is grasped in the hand and as seen in Figure 1, is rotated counter-clockwise (as viewed in Figures 1 and 2) in order to cause the weight 15 to rise to the top until it contacts the stop tooth 16 within the tube 9. In doing so, the conveyer belt 13 is wound upon the drum 27 of the spool 28, and at the same time the openings 32 cause the animation of the figures 6 and 7 with their resultant tonal effects. When the weight 15 has reached the top, the handle 29 is released and the weight allowed to drop; its gradual descent according to the adjustment of the orifices 18 and 20 respectively, thus causes additional animation and tonal effects to be produced by the figures until the weight reaches the top of the bushing 17 whence the same cycle of operation may be repeated. The operation of my toy is believed to furnish great amusement and pleasure to youngsters, providing the animation and sound effects hereinbefore expounded.

Altho I have herein disclosed a structure for providing animation to two figures, it is understood that more than two figures may be utilized, if it should be so desired; and if mounted in the path of travel of the actuating belting or member 13, animation to many other figures may be supplied. Inasmuch as my herein disclosure is susceptible of many modifications, alterations and improvements, I hereby reserve the right to all such modifications, alterations and improvements which come within the scope and spirit of my invention, within the disclosure in the accompanying drawing, as well as within the purview of the foregoing description; my invention to be limited only by the subjoined claims.

Having thus disclosed and revealed my invention what I claim as novel and desire to secure by Letters Patent is:

1. A toy of the character described comprising, a hollow resonant element, at least one figure pivotally mounted on the said hollow resonant element and provided with toothed trip means, and counterweighted tape means provided with slotted engaging means adapted to trip intermittently the said toothed trip means, causing a portion of the said figure to strike the said hollow resonant element.

2. A toy of the character described comprising, a hollow resonant element, at least one figure pivotally mounted on the said hollow resonant element and provided with toothed trip means, counterweighted tape means provided with slotted engaging means adapted to trip intermittently the said toothed trip means, causing a portion of the said figure to strike the said hollow resonant element, and fluid resistance means associated with the said counterweighted tape means adapted to vary the descent of the counterweighted element.

3. A toy of the character described comprising, a hollow resonant element, at least one figure pivotally mounted on the said hollow resonant element and provided with toothed trip means, counterweighted tape means provided with slotted engaging means adapted to trip intermittently the said toothed trip means, causing a portion of the said figure to strike the said hollow resonant element, and adjustable fluid resistance means associated with the said counterweighted tape means adapted to vary the descent of the counterweighted element.

4. A toy of the character described comprising, a hollow base element, a hollow resonant element mounted on the said base element, at least one figure pivotally mounted on the said resonant element and provided with toothed trip means, counterweighted tape means provided with slotted engaging means adapted to trip intermittently the said toothed trip means during downward movement of the tape, causing a portion of the said figure to strike the said hollow resonant element, adjustable fluid resistance means associated with the said counterweighted tape means adapted to vary the descent of the counterweighted element, drum means rotatably mounted in the said hollow base element and secured to the free end of the said counterweighted tape means, and motivating means associated with the said drum means.

5. A toy of the character described comprising, a hollow base element, a hollow resonant element mounted on the said base element, at least one figure pivotally mounted on the said resonant element and provided with toothed trip means, counterweighted tape means provided with slotted engaging means adapted to trip intermittently the said toothed trip means during downward movement of the tape, causing a portion of the said figure to strike the said hollow resonant element, adjustable fluid resistance means associated with the said counterweighted tape means adapted to vary the descent of the counterweighted element, drum means rotatably mounted in the said hollow base element and secured to the free end of the said counterweighted tape means, motivating means associated with the said drum means, and a second figure pivotally mounted on said base element and provided with toothed trip means adapted to be intermittently oscillated by the slotted engaging means of the said counterweighted tape means, causing a portion of the said second figure to strike the said hollow resonant element.

FRANK E. THOMAS.